US011505009B2

(12) United States Patent
Kukkonen et al.

(10) Patent No.: US 11,505,009 B2
(45) Date of Patent: Nov. 22, 2022

(54) METHOD FOR MAKING A BLIND HOLE IN A TIRE AND A METHOD FOR INSERTING AN INSERT TO THE BLIND HOLE

(71) Applicant: Nokian Renkaat Oyj, Nokia (FI)

(72) Inventors: Esko Kukkonen, Nokia (FI); Jari Ojala, Nokia (FI); Teemu Soini, Tampere (FI); Atte Antikainen, Pirkkala (FI); Jani Räisänen, Pirkkala (FI)

(73) Assignee: NOKIAN RENKAAT OYJ, Nokia (FI)

( * ) Notice: Subject to any disclaimer, the term of this patent is extended or adjusted under 35 U.S.C. 154(b) by 0 days.

(21) Appl. No.: 15/733,901

(22) PCT Filed: Jun. 5, 2019

(86) PCT No.: PCT/FI2019/050431
§ 371 (c)(1),
(2) Date: Dec. 1, 2020

(87) PCT Pub. No.: WO2019/234300
PCT Pub. Date: Dec. 12, 2019

(65) Prior Publication Data
US 2021/0245552 A1 Aug. 12, 2021

(30) Foreign Application Priority Data

Jun. 8, 2018 (EP) .................................. 18397517

(51) Int. Cl.
*B60C 11/16* (2006.01)
*B60C 11/03* (2006.01)
(52) U.S. Cl.
CPC ...... *B60C 11/1637* (2013.01); *B60C 11/1625* (2013.01); *B60C 11/0302* (2013.01)

(58) Field of Classification Search
CPC ............ B60C 11/1637; B60C 11/1656; B60C 11/243; B60C 11/246; B23B 51/0027; B23B 51/0036; B23B 51/0045
(Continued)

(56) References Cited

U.S. PATENT DOCUMENTS 2,194,234 A * 3/1940 Roisum ............... B23B 51/0045
82/1.2
2,215,939 A * 9/1940 Shaw .................. B23B 51/0045
82/1.5
(Continued)

FOREIGN PATENT DOCUMENTS

CN 102046397 A 5/2011
CN 103863019 A 6/2014
(Continued)

OTHER PUBLICATIONS

Rocket Seals Inc. "What Is THE DUROMETER of An o-Ring?: ROCKET Seals, Inc." What Is the Durometer of an O-Ring? | Rocket Seals, Inc., Oct. 20, 2015, www.rocketseals.com/blog/2015/10/20/what-is-the-durometer-of-an-o-ring/. (Year: 2015).*
(Continued)

*Primary Examiner* — Robert C Dye
*Assistant Examiner* — Alexander D Booth
(74) *Attorney, Agent, or Firm* — Merchant & Gould P.C.

(57) ABSTRACT

A method for making a blind hole in a prefabricated tire and a method for inserting an insert to such a blind hole are disclosed. The former comprises arranging available a prefabricated tire comprising tread blocks forming the tread of the tire, and thereafter machining such a blind hole to a tread block of the tire that the blind hole has a first cross section at a first depth and a second cross section at a second depth, (Continued)

wherein the second cross section is greater than the first cross section and the second depth is greater than the first depth.

14 Claims, 14 Drawing Sheets

(58) Field of Classification Search
USPC .......................................................... 425/37
See application file for complete search history.

(56) References Cited

U.S. PATENT DOCUMENTS

| | | | | |
|---|---|---|---|---|
| 3,504,414 | A * | 4/1970 | Johnm | ................... B29D 30/66 29/235 |
| 3,571,893 | A * | 3/1971 | Haviland | ............... B29D 30/66 29/815 |
| 4,594,033 | A * | 6/1986 | Peetz | .................. B23B 51/0045 408/153 |
| 5,198,048 | A | 3/1993 | Hojo | |
| 2004/0149093 | A1* | 8/2004 | Tang | .................. B23B 51/0045 82/1.2 |
| 2004/0163746 | A1 | 8/2004 | Eromaki | |
| 2005/0192727 | A1* | 9/2005 | Shostak | .................. B60R 21/20 701/37 |
| 2011/0146865 | A1 | 6/2011 | Durat et al. | |
| 2014/0166168 | A1* | 6/2014 | Engel | .................. B60C 23/0433 152/154.2 |
| 2016/0311267 | A1 | 10/2016 | Matsumoto | |
| 2017/0203615 | A1 | 7/2017 | Matsumoto | |
| 2017/0297380 | A1* | 10/2017 | Endo | .................. B60C 11/1668 |
| 2017/0361661 | A1* | 12/2017 | Wei | .......................... B60C 11/24 |
| 2017/0368889 | A1 | 12/2017 | Ajoviita et al. | |
| 2020/0338932 | A1* | 10/2020 | Raisanen | .............. B60C 11/243 |

FOREIGN PATENT DOCUMENTS

| | | | | |
|---|---|---|---|---|
| CN | 105026183 | A | 11/2015 | |
| DE | 3143462 | A1 | 5/1983 | |
| DE | 3205543 | A1 * | 8/1983 | ......... B23B 51/0027 |
| DE | 102011089314 | A1 | 6/2012 | |
| EP | 0094070 | B1 * | 8/1985 | ......... B23B 51/0027 |
| EP | 2583840 | A1 | 4/2013 | |
| EP | 2641754 | A2 | 9/2013 | |
| GB | 2048135 | A | 12/1980 | |
| JP | 2009023603 | A * | 2/2009 | |
| JP | 2010111130 | A | 5/2010 | |
| SU | 1646906 | A1 * | 5/1991 | ............. B29D 30/66 |
| WO | 2018/070378 | A1 | 4/2018 | |

OTHER PUBLICATIONS

ESpaceNet Translation of SU 1646906. (Year: 2021).*
ESpaceNet Translation of JP2009023603 (Year: 2021).*
Sensor Applications, Eaton Corporation, 2008, www.galco.com/techdoc/chgp/e57-12le06-aa_app.pdf. (Year: 2008).*
TSIT-8, TSIT-9 & TSIT-11 Tire Stud Insertion Tool, Bruno Wessel, 2016, brunowessel.com/studding-equipment/stud-insertion-tool/. (Year: 2016).*
Screenshots from the Youtube Video "How To—BW Stud Insertion Tool TSIT-9—Bruno Wessel" by Bruno Wessel LTD. Uploaded Oct. 25, 2016, <https://www.youtube.com/watch?v=hU6hyKOeebE> (Year: 2016).*
ESpaceNet Translation of EP0094070 (Year: 2022).*
ESpaceNet Translation of DE3205543 (Year: 2022).*
Google Patent Translation of JP2010111130 (Year: 2022).*
Youtube. How To—BW Stud Insertion Tool TSIT-9—Bruno Wessel. Oct. 25, 2016 (Oct. 25, 2016), XP054978881, Retrieved from the Internet: URL:https://youtu.be/hU6hyKOeebE [retrieved on Nov. 19, 2018] See e.g. the video passaged around:—0:08/1:37,—0:59/1:37,—1:00/1:37,—1:05/1:37,—1:06/1:37,—1:10/1:37.
Chinese Office Action for CN Application No. 201980038275.5 dated Mar. 3, 2022 (22 pages, with English Translation).

* cited by examiner

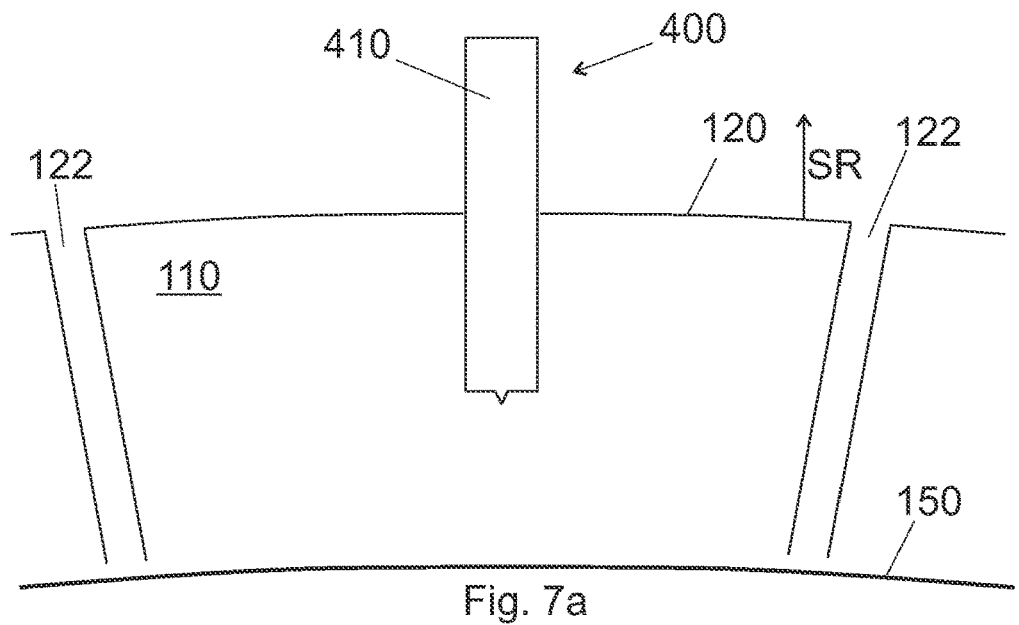
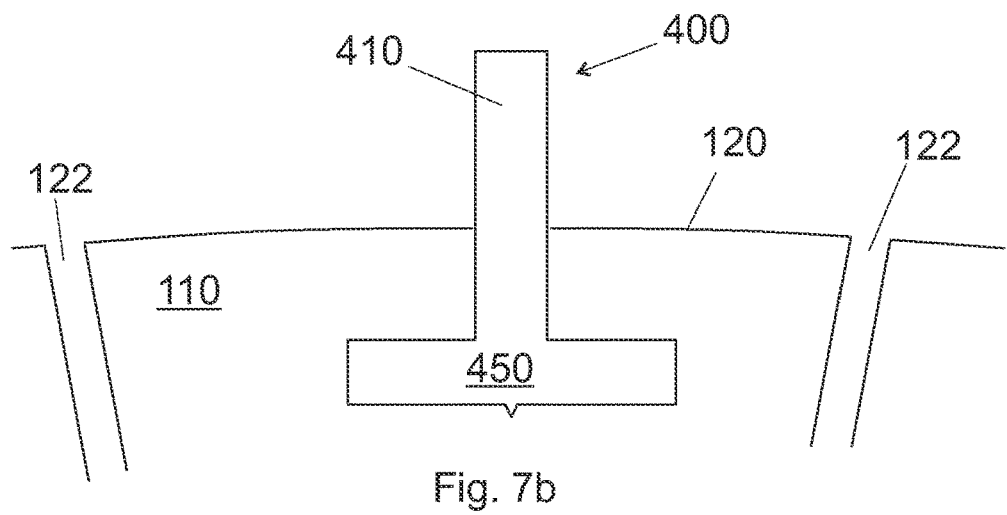
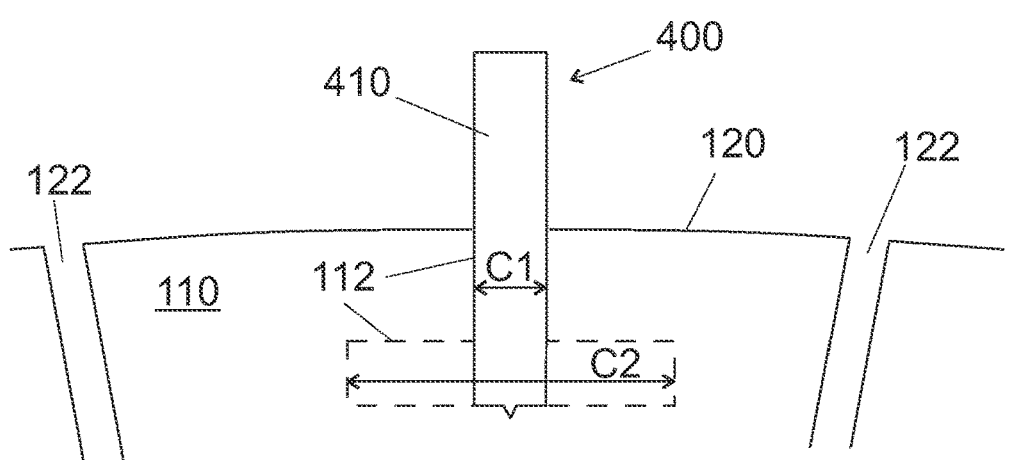

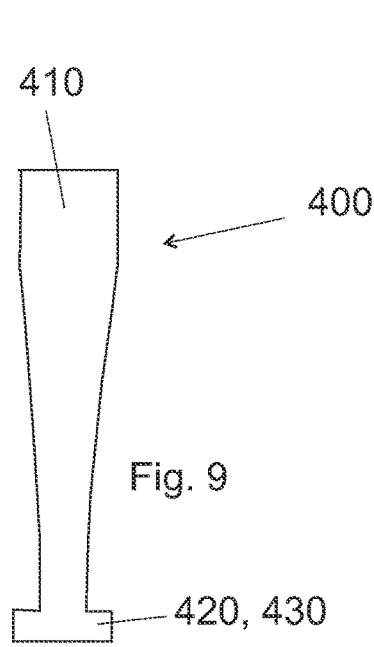
Fig. 9
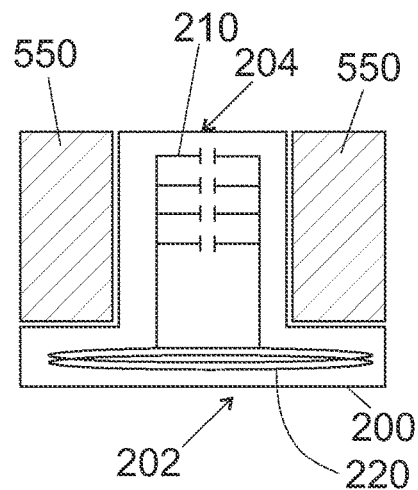
Fig. 10a
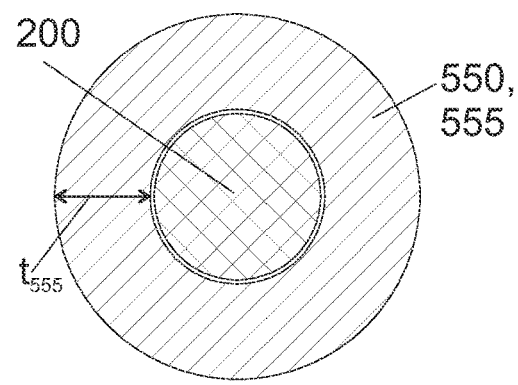
Fig. 10b
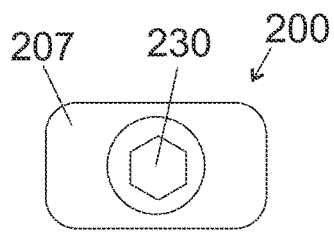
Fig. 10c1
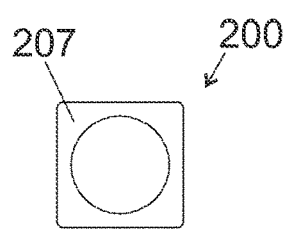
Fig. 10d1
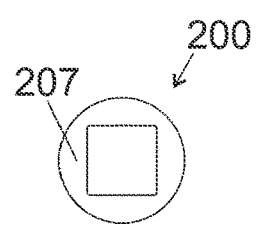
Fig. 10e1
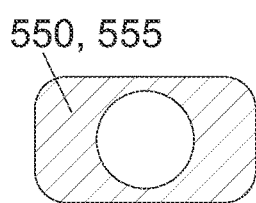
Fig. 10c2
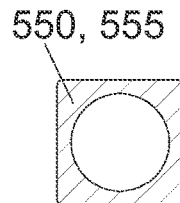
Fig. 10d2
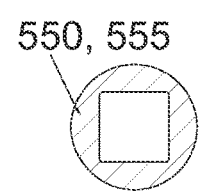
Fig. 10e2

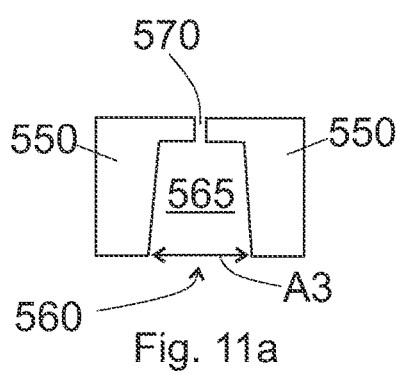
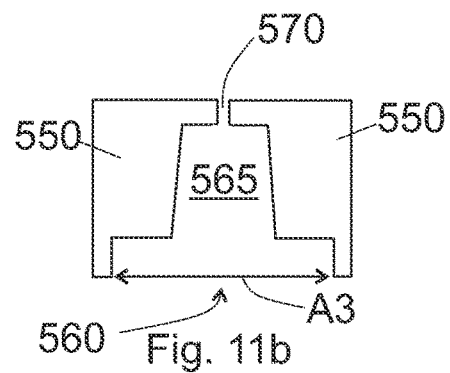
Fig. 11a  Fig. 11b
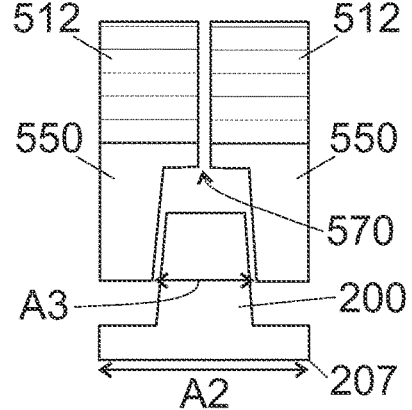
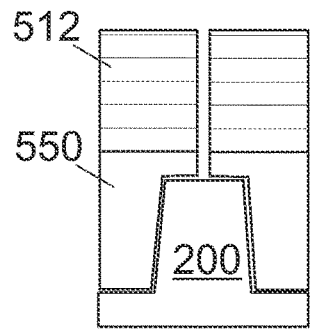
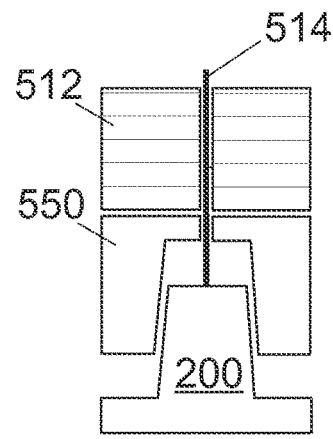
Fig. 12a  Fig. 12b  Fig. 12c
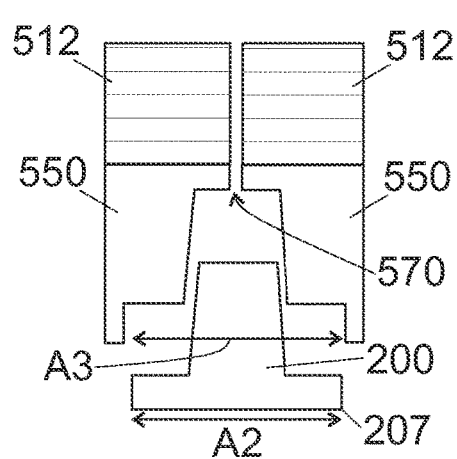
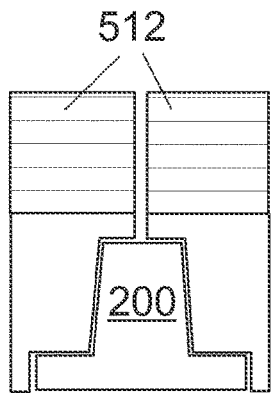
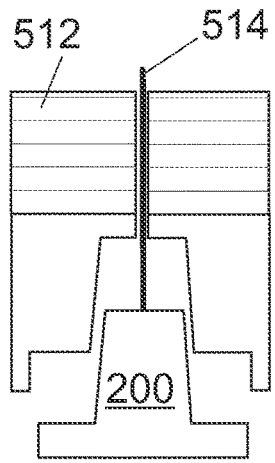
Fig. 13a  Fig. 13b  Fig. 13c

METHOD FOR MAKING A BLIND HOLE IN A TIRE AND A METHOD FOR INSERTING AN INSERT TO THE BLIND HOLE

PRIORITY

This application is a U.S. national application of the international application number PCT/FI2019/050431 filed on Jun. 5, 2019, which claims priority of European application 18397517.6 filed on Jun. 8, 2018, the contents of all of which are incorporated herein by reference.

TECHNICAL FIELD

The disclosed solution relates to tires, particularly prefabricated tires, comprising inserts. In particular, the disclosed solution relates to methods for inserting such in inserts into such tires.

BACKGROUND

It is known that inserts, such as studs, may be inserted into tires by way of first bringing about insert-appropriate holes with molds in conjunction with fabricating, i.e. manufacturing, of the tires, then removing the molds, and eventually inserting inserts into the mold-shaped holes in the tires.

Such a method, however, requires the holes for inserts to be made in conjunction with fabricating the tires, which has the drawback that the number, position(s) and the shape(s) of the holes for the inserts need to be known before the tires are manufactured.

Consequently, such a method is not suitable for retrofitting already manufactured tires with inserts whose number, position(s), shape(s) and/or dimension(s) are/were not already known or otherwise completely anticipated in advance of manufacturing the tires.

Furthermore, the aforementioned known mold-based method is mainly suitable, especially with respect to efficiency and expediency, for large-batch manufacturing with little or preferably no variation in tires with respect to their equipping with inserts.

Consequently, such method is not suitable for variably equipping tires with application-appropriate inserts, including their number, positioning, shape and dimensioning.

Such inappropriateness concerns over the known mold-based method are particularly pronounced in—but not exclusive to—the case of so-called 'smart' tires. Such 'smart' tires may comprise various inserts with variable functionality—such as measuring wear, friction, moisture and acceleration—shape, dimensioning and positioning in the tire. In other words, 'smart' tires may be made differentially 'smart' by way of differentially incorporating application-appropriate inserts in them. In other words, 'smart' tires preferably can be tailored in terms of their insert configuration, and most preferably such tailoring can be accomplished at the level of an individual tire.

Such problems cannot be satisfactorily addressed with drilling, with a normal drill bit, holes for inserts, because—as is known—the resulting cylindrical holes do not offer structural, geometry-induced support against inserts coming off from such cylindrical holes.

In addition, inserts that are typically required in 'smart' tires usually comprise electronic components or are otherwise more fragile than metal- and/or ceramics-based friction-increasing inserts typically used in studded tires.

Consequently, the currently employed robotized or automatized methods for inserting inserts into a tire, such as those based on a so-called 'stud gun', bear the risk of damaging fragile inserts such as those typically required in 'smart' tires.

In view of the foregoing, the aim of the disclosed solution is to address and alleviate the above-mentioned problems in inserting inserts into tires, particularly vulcanized tires and, analogously, into prefabricated tires fabricated in another way.

SUMMARY

The disclosed solution comprises a method for making a blind hole in a prefabricated tire. The method comprises arranging available a prefabricated tire comprising tread blocks forming the tread of the tire, and thereafter machining such a blind hole to a tread block of the tire that the blind hole has a first cross section at a first depth and a second cross section at a second depth, wherein the second cross section is greater than the first cross section and the second depth is greater than the first depth.

The principles of the disclosed solution apply also to tires which do not comprise distinct tread blocks, as would be in the case of a slick tire or a grooved tire. In such cases, the blind hole is machined to a tread of such a tire.

The disclosed solution also comprises a method for inserting an insert into a tread of a prefabricated tire, the method comprising arranging available the insert, making a blind hole as mentioned above, in a prefabricated tire, and thereafter inserting the insert into the blind hole.

Thus, according to the disclosed solution, such a blind hole may be machined in a prefabricated, i.e. an already fabricated, tire that the blind hole is capable of providing structural, geometry-induced support for an insert against the insert coming off from the blind hole. For example, an insert with a bottom flange may installed in such a blind hole so that the second cross section at a second depth may accommodate the flange while the rest of the body of the insert is accommodated by the first cross section of the blind hole.

As the blind holes are, according to the disclosed solution, machined in a prefabricated tire, such blind holes may be machined in any desired number and/or position in the tire. Furthermore, by appropriately selecting the machining implements and methods, the shape and dimensionality of a blind hole may be selected, as will be described more in detail further below.

With respect of the shape of an insert installable in such a blind hole, according to the disclosed solution, the insert may extend in a longitudinal direction from a bottom of the insert to a top of the insert. Such an insert may have a first cross section at a first longitudinal position from the bottom and a second cross section at a second longitudinal position from the bottom. Therein, the first longitudinal position is located closer to the top than the second longitudinal position and the second cross section is greater than the first cross section. According to the disclosed solution, such an insert may be inserted into the blind hole such that the bottom of the insert is inserted deeper in the blind hole than the top of the insert.

Thus, the shape of the insert may be selected co-operatively with the shape of the blind hole in such a manner that the insert may gain structural support from the blind hole against coming off from the blind hole. For example, the insert may comprise a bottom flange which is dimensionally compatible with the second cross section of the blind hole.

Specifically, with respect to ensuring and/or improving the staying of an insert in its installed position in the blind hole, according to the disclosed solution, such a blind hole may be machined to a tread block that the shape of the blind hole is geometrically congruent with the insert. Preferably, the blind hole is machined such that a wall of the blind hole comprises a marking being indicative of the blind hole having been machined to the tread block after the tread block was fabricated.

Consequently, a tire according to the disclosed solution may be such that a wall of the blind hole comprises a marking being indicative of the blind hole having been machined to the tread block after the tread block was fabricated. Alternatively or in addition, a tire according to the disclosed solution may be such that removal of an insert from the tread block exposes such a blind hole that a wall of the blind hole comprises a marking being indicative of the blind hole having been machined to the tread block after the tread block was fabricated.

With respect to inserts typically required in 'smart' tires, according to the disclosed solution, the insert may comprise a primary capacitive component and a primary inductive component. Such an insert may be configured to measure a condition, such as wear, of the tire, and/or be configured to measure an environmental parameter, such as humidity or friction—as an example, the insert may comprise a sensor for the purpose—and/or be configured to indicate a condition, such as wear, of the tire, and/or be configured to improve the friction of the tire.

In order to protect the integrity of the insert(s) during installation into a blind hole, according to the disclosed solution, before inserting the insert into the blind hole at least a part of the insert may be arranged into a sleeve, followed by inserting the insert to the blind hole with the sleeve.

BRIEF DESCRIPTION OF THE DRAWINGS

FIGS. 7a-7c illustrate sequentially progressing phases of machining, with a drill bit comprising a radially expanding part, a blind hole into a tread block of a tire, as viewed cross-sectionally from a side.

FIG. 9 illustrates a drill bit according to an example.

FIG. 10a illustrates an insert with a sleeve, as viewed cross-sectionally from a side.

FIG. 10b illustrates an insert with a sleeve, as viewed from above.

FIG. 10c1 illustrates an insert comprising a flange, as viewed from above.

FIG. 10c2 illustrates the insert of FIG. 10c1 with a sleeve, as viewed from above.

FIG. 10d1 illustrates an insert comprising a flange, as viewed from above.

FIG. 10d2 illustrates the insert of FIG. 10d1 with a sleeve, as viewed from above.

FIG. 10e1 illustrates an insert comprising a flange, as viewed from above.

FIG. 10e2 illustrates the insert of FIG. 10e1 with a sleeve, as viewed from above.

FIGS. 11a-11b illustrate, according to examples, a sleeve, as viewed cross-sectionally from a side.

FIG. 12a illustrates an insert and a punch comprising a sleeve, according to an example and as viewed cross-sectionally from a side.

FIG. 12b illustrates a punch comprising a sleeve with an insert in the sleeve, according to an example and as viewed cross-sectionally from a side.

FIG. 12c illustrates, according to an example, expelling an insert form a sleeve with a rod.

FIG. 13a illustrates an insert and a punch comprising a sleeve, according to an example and as viewed cross-sectionally from a side.

FIG. 13b illustrates a punch comprising a sleeve with an insert in the sleeve, according to an example and as viewed cross-sectionally from a side.

FIG. 13c illustrates, according to an example, expelling an insert form a sleeve with a rod.

The Figures are intended to illustrate the general principles of the disclosed solution. Therefore, the illustrations in the Figures are not necessarily in scale or suggestive of precise layout of system components.

DETAILED DESCRIPTION

Figure 1A:
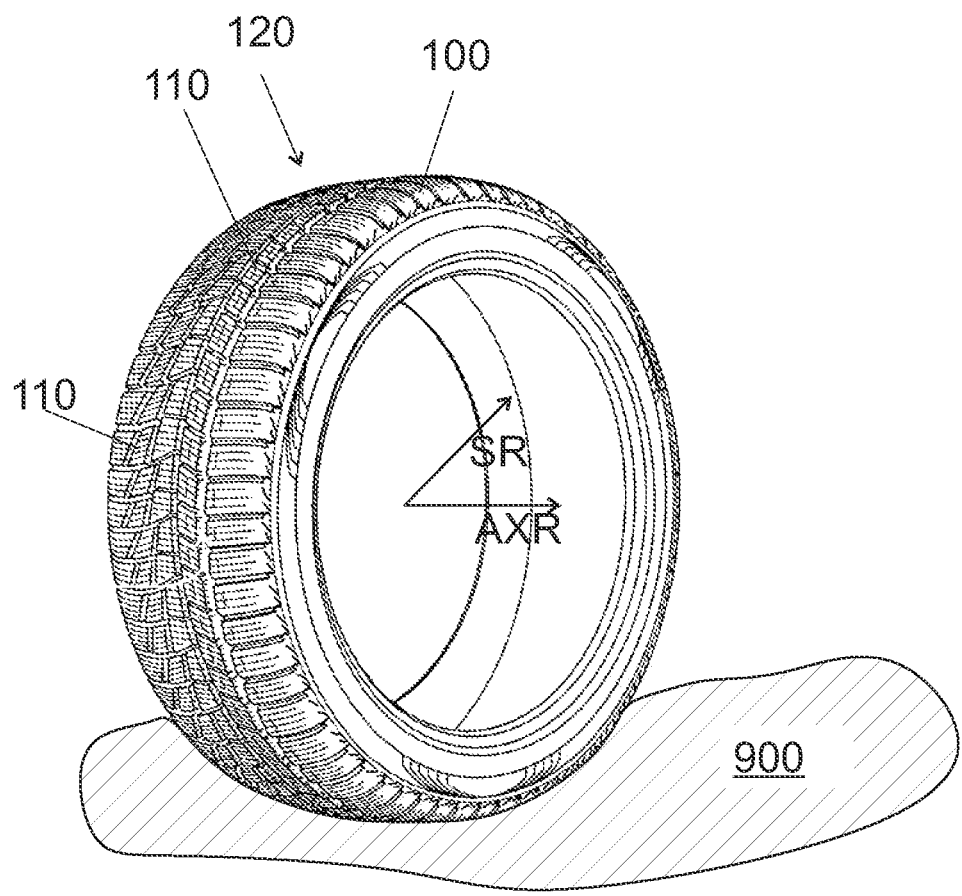
FIG. 1a illustrates a tire.

In the text, references are made to the Figures with the following numerals and denotations:
100 Tire
110 Tread block, of tire
112 Blind hole
112a Bottom, of blind hole 112b Aperture, of blind hole
112c Wall, of blind hole
113 Marking
114 Adhesive
120 Tread, of tire
122 Groove
130 Inner surface, of tire
150 Reinforcing belt
155 Ply
200 Insert
202 Bottom, of insert
204 Top, of insert
205 Side, of insert
207 Flange, of insert
210 Primary capacitive component
220 Primary inductive component
230 Hard metal pin
235 Supportive flange
240 Sensor
300 Interrogator
310 Communication circuit
320 Secondary inductive component
330 Power source
340 Sensor
400 Drill bit
410 Shaft, of drill bit
420 Protrusion, of drill bit
430 Flange, of drill bit
450 Part, of drill bit shaft
500 Tool
502 Jaw, of tool
504 Jaw, of tool
510 Cylinder
512 Punch
514 Rod
550 Sleeve
555 Wall, of sleeve
560 First aperture, of sleeve
565 Cavity, of sleeve
570 Second aperture, of sleeve
600 Position sensor
900 Surface
α Angle
A1 First cross section, of insert
A2 Second cross section, of insert
A3 First cross section, of sleeve
Amax Maximal cross-sectional area, of insert
AXR Axial direction
C1 First cross section, of blind hole
C2 Second cross section, of blind hole
$d_{112}$ Depth, of blind hole
$d_{150}$ Distance, between tread and reinforcing belt
de1 First depth, in blind hole
de2 Second depth, in blind hole
N1 Normal, of tread
Pmax Plane of maximum cross section
r1 First longitudinal position, in insert
r2 Second longitudinal position, in insert
SR Radial direction
$t_{555}$ Thickness, of sleeve wall
z200 Longitudinal direction Referring to FIG. 1a, the disclosed solution relates to a tire 100. Such a tire 100 may be pneumatic and/or prefabricated.

As a terminological clarification, and as readily appreciated by a person skilled in the art, a prefabricated tire 100 means a tire 100 which has been manufactured, i.e. fabricated, and could be used already as such without additional furnishings such as those described below. Such a prefabricated tire 100 may be, for example, a vulcanized tire 100, but may be prefabricated in another way as well.

Such a 100 tire may be, for example, a tire 100 for a passenger vehicle, such as a passenger car or a motorcycle. Such a tire 100 may be, for example, a so-called heavy tire, for a heavy machine such as a truck, a caterpillar, a harvester or a front loader. Such a tire 100 may be a tire for use on slippery surfaces, such as a winter tire.

Such a tire 100 typically comprises a tread 120, which is in contact with a surface 900 such as a road surface during the normal use of the tire 100. Such a tread 120 typically comprises a tread pattern which comprises a plurality of tread blocks 110. Such tread blocks 110 typically are surrounded by grooves 122.

The material of the tread blocks 110, or at least the tread block 110 in which an insert 200 is installed in accordance with what is described below, may have a Shore hardness of from 50 ShA to 80 ShA according to ASTM standard D2240, version 15e1. According to an example, the tread block(s) have such a Shore hardness at a temperature of 23° C.

As is known, a tire 100 may rotate around an axis of rotation AXR, in which case an outward centrifugal force acts on the constituent parts of the tire 100 along a radial direction SR.

Figure 1B:
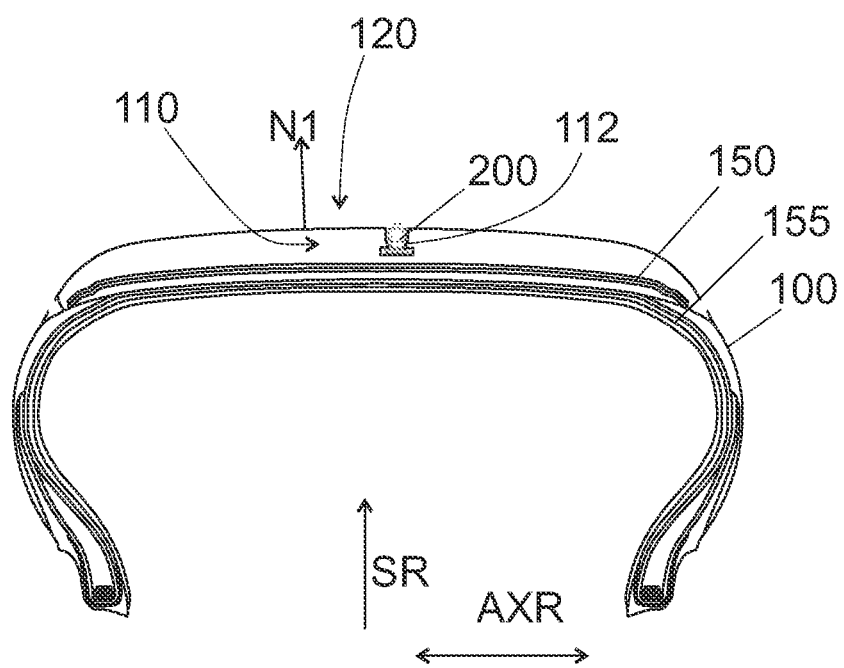
FIG. 1b illustrates, in a half cross section, a tire comprising an insert in a blind hole.
Figure 1C:
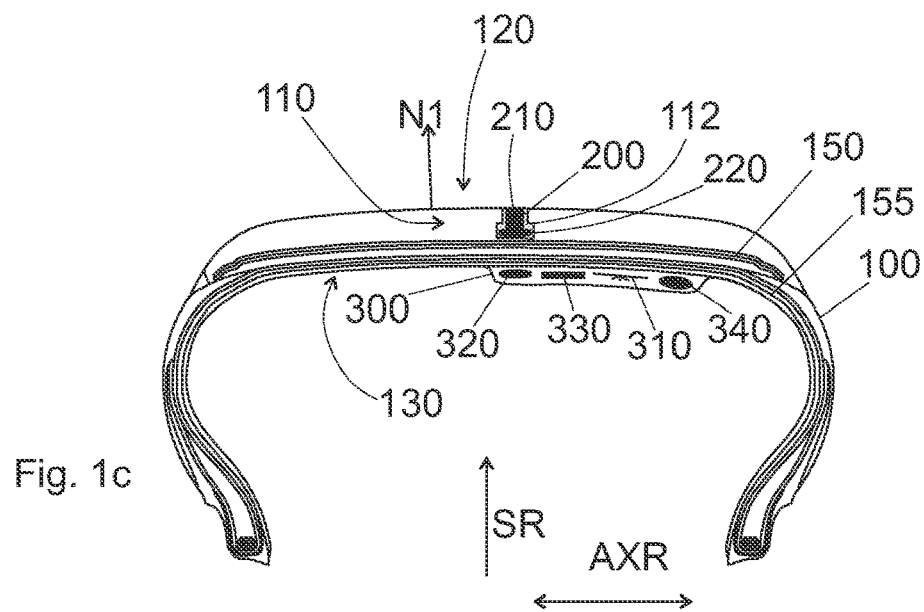
FIG. 1c illustrates, in a half cross section, a tire comprising an insert in a blind hole, and an interrogator.

As is typical for certain types of tires 100, and as is illustrated in FIGS. 1b-1c, the tire 100 may comprise a reinforcing belt 150 arranged between the tread 120 and the inner surface 130 of the tire 100.

According to the disclosed solution, such a tire 100 may be equipped with an insert 200 and, therefore, comprise an insert 200. Such an insert 200 may be, for example, a friction-increasing stud as is typical in winter tires. As another example, such an insert 200 may be configured to sense a measure of interest such as the wear of the tread 120 of the tire 100. As yet another example, such an insert 200 may combine the above-mentioned capabilities of a stud and sensing a measure of interest.

Correspondingly, the disclosed solution comprises a method for inserting an insert 200 into a tread 120 of a tire 100, preferably a prefabricated tire 100, such as a vulcanized tire 100.

A tire 100 according to the disclosed solution may comprise one or more inserts 200. Such inserts 200 may be of one or more different types.

Now referring to FIG. 1c, in case a tire 100 comprises an insert 200 configured to sense a measure of interest, the tire 100 may comprise an interrogator 300 configured to communicate with the insert 200. Such an interrogator 300 may be attached to the inner surface 130 of the tire 100. Such an interrogator 300 may comprise a power source 330, preferably an electric power source 330, to provide electricity for powering the functionality of the interrogator 300 and an communication circuit 310 to perform measurements and communication to external device(s) (not depicted). Typically, the power source 330 is a battery configured to provide electricity by converting chemical energy into electricity. Alternatively or in addition, the power source 330 may comprise an energy harvesting device, such as a piezoelectric energy harvesting device or a triboelectric energy harvesting device, which device may comprise a battery and/or a capacitor as one of its elements.

Figure 2A:
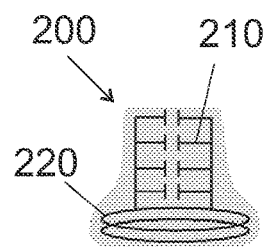
FIGS. 2a-2i illustrate inserts according to examples.
Figure 2B:
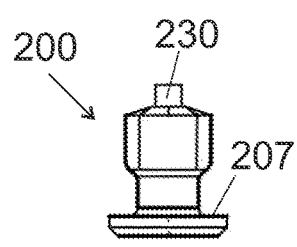
Figure 2C:
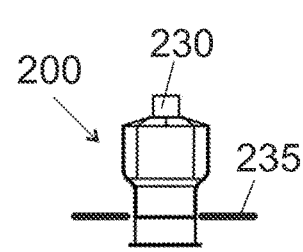
Figure 2D:
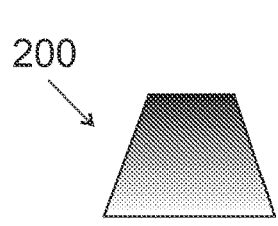
Figure 2E:
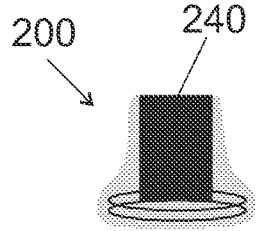
Figure 2F:
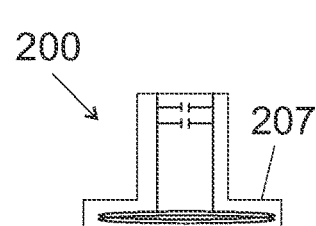

For the purposes of communication between an insert 200 and an interrogator 300, the insert 200 may comprise a primary inductive component 200 and a primary capacitive component 210—as is illustrated in FIGS. 2a and 2f for example—and the interrogator 300 may comprise a secondary inductive component 320. In such a case, the communication between the insert 200 and the interrogator 300 may arise from the secondary inductive component 220 being capable of transforming magnetic energy into electricity, which becomes temporarily stored in a primary capacitive component 210. Such magnetic energy may originate from a primary inductive component 320 of the interrogator 300. The interrogator 300 may thereby comprise an energy source, such as a power source 330, for example a battery, to provide energy for the components and functioning of the interrogator 300, including an inductive component 320. Consequently, the interaction between the passive circuit 200 and the interrogator 300 may be premised on the mutual inductance of the secondary inductive component 220 and the primary inductive component 320. That is, the primary inductive component 320 and the secondary inductive component 220 may be in an electromagnetic connection with each other.

Specifically, the method according to the disclosed solution may comprise attaching an interrogator 300 onto an inner surface 130 of a prefabricated tire 100, wherein the interrogator 300 is configured to magnetically couple with the insert 200. Such an interrogator 300 may comprise comprises a power source 330, a communication circuit 310, and a secondary inductive component 320, and the secondary inductive component 320 may be configured to magnetically couple with a primary inductive component 220 of the insert 200.

FIGS. 2a-2i illustrate examples of inserts 200 in accordance with the disclosed solution.

As illustrated in FIG. 2a, an insert 200 may comprise a primary capacitive component 210 and a primary inductive component 220, for example to enable communication with an interrogator 300. As illustrated in FIG. 2f, such an insert 200 may comprise a flange 207. If the insert 200 is arranged to sense the wear of the tread 120 for example, the secondary capacitive component 210 may wear with the tread 120 as a consequence of the insert 200 having been inserted into the tread 120, whereby the sensing of the wear of the tread 120 may be premised on the wear-induced change in the capacitance of the capacitive component 210. In view of the preceding, the insert 200 may, thus, be configured to measure a condition, such as wear, of the tire (100).

As illustrated in FIG. 2b, an insert 200 may comprise a hard metal pin 230 at that end of the insert 200 which is configured to be in contact with a surface 900. An insert 200 thusly equipped with a hard metal pin 230 may also comprise a flange at or towards the other end of the insert 200. Thus, an insert 200 may be configured to improve the friction of the tire 100.

As illustrated in FIG. 2c, an insert 200 comprising a hard metal pin 230 may comprise a supportive flange 235 movably connected to the body of the insert 200. Such a supportive flange 235 may therefore be configured to allow the insert 200 to move relative to supportive flange 235, i.e. have some travel through but without becoming separated from the supportive flange 235. With such a configuration, the pressing force of hard metal pin 230 against the surface 900 may be controllably reduced, and consequently the wear of the surface 900 reduced.

Figure 2G:
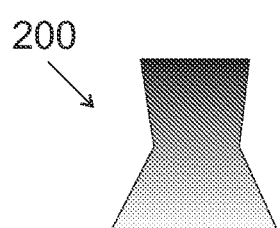

An insert 200 may be configured to indicate a condition, such as wear, of the tire 100. Towards such an end, as illustrated in FIGS. 2d and 2g, an insert 200 may, for example, be variably colored along the vertical dimension of the insert 200. With such variable coloring, the degree of wear of the insert 200 may be visually observed based on the color of the insert 200. As illustrated by FIGS. 2d and 2g, such a variably colored insert 200 may comprise, with respect to its vertical cross section, a conical shape or a double-conical shape, or another geometrical shape.

An insert 200 may be configured to measure an environmental parameter, such as humidity or friction. Towards such an end, as illustrated in FIG. 2e, an insert 200 may comprise a sensor 240 for the purpose. In such a case, the insert 200 may also comprise means for communicating with an interrogator 300, such as a primary inductive component 220.

Figure 2H:
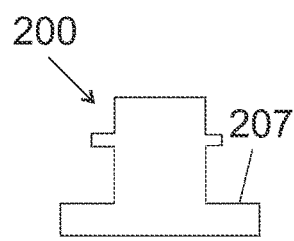
Figure 2I:
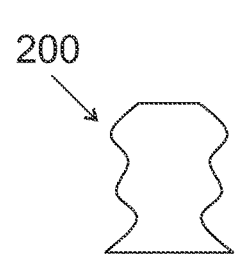

As illustrated in FIGS. 2h and 2i, an insert 200 may comprise a more complex geometrical shape, which shape may be configured to facilitate the staying of the insert 200 in its installed position in a tread block 110 of a tire, such as in a blind hole 112 in a tread block 110 of a tire. As a specific example of such a more complex geometrical shape, an insert 200 may comprise, with respect to its vertical cross section, two or more flanges vertically separated from each other, as illustrated in FIG. 2h in the case of two flanges. As another specific example of such a more complex geometrical shape, an insert 200 may comprise, with respect to its vertical cross section, undulating side walls, as illustrated in FIG. 2i.

Figure 3A:
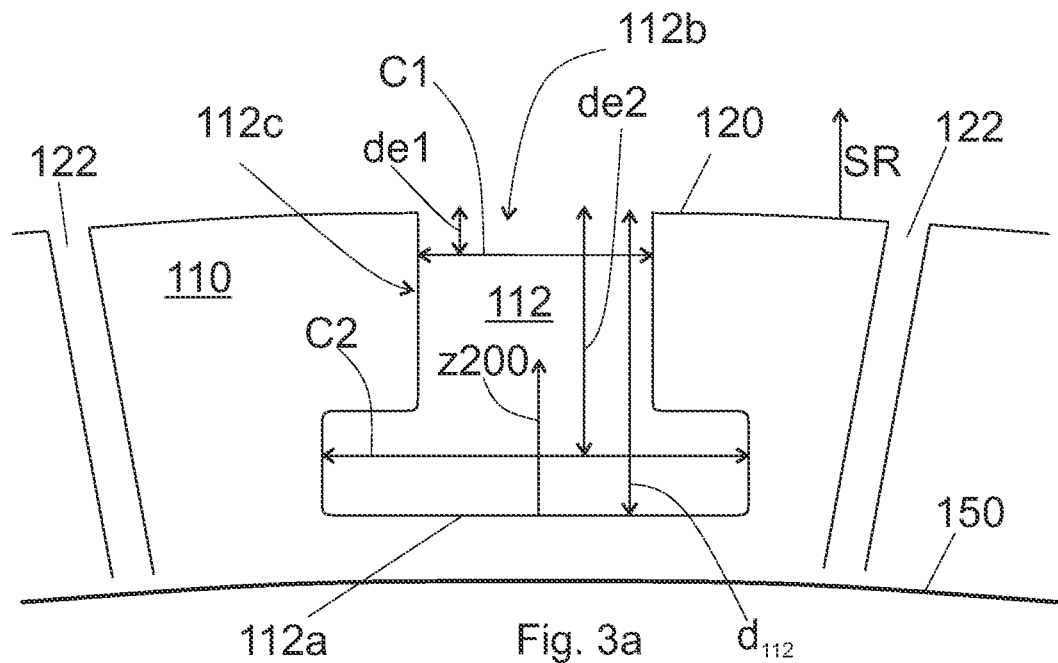
FIG. 3a illustrates a blind hole in a tread block of a tire, as viewed cross-sectionally from a side.

Now referring to FIG. 3a, according to the disclosed solution an insert 200 is inserted to a tread 110 block of a tire 100, preferably a prefabricated tire 100. Towards that end, after arranging available a tire 100 comprising tread blocks 110 forming the tread 120 of the tire 100 and arranging available the insert 200, a blind hole 112 may be machined to a tread block 110 of the tire. Thereafter, the insert 200 may be inserted to the blind hole 112.

In case the tire 100 is a pneumatic tire 100, the tire 100 may be inflated at the time of machining to the blind hole 112.

Such a blind hole 112 may be manufactured to the tread block 110 by drilling. Herein, by drilling is referred to cutting a hole with a rotary cutting implement. Below, such a rotary cutting implement is also referred to as a drill bit.

Still referring to FIG. 3a, such a blind hole 112 extends, from its bottom 112a to an aperture 112b in the tread block 110, in a longitudinal direction z200, the longitudinal direction z200 being parallel to or forming an angle α of at most 75 degrees with a radial direction SR of the tire at the location of the blind hole 112.

According to an example, a blind hole 112 is a hollow of revolution, i.e. a hollow space in a shape of a solid of revolution. In such a case, the revolution is around the longitudinal direction z200.

Still referring to FIG. 3a, between the bottom 112a and the aperture 112b, the blind hole 112 is delimited by wall(s) 112c. As seen in FIG. 3a, the wall(s) 112c may be non-linear in terms of its/their vertical progression. That is, a blind hole 112 has a first cross section C1 at a first depth de1 and a second cross section C2 at a second depth de2, and those cross sections C1 and C2 may be different from each other. For the purposes of improving the staying of an insert 200 in its installed position in a blind hole 112—especially in the case of an insert 200 comprising a flange 207 at its non-surface 900-facing end—the blind hole 112 may be wider from one depth than at another depth. That is, it may be the case that the blind hole 112 has a first cross section C1 at a first depth de1 and a second cross section C2 at a second depth de2, wherein the second cross section C2 is greater than the first cross section C1 and the second depth de2 is greater than the first depth de1.

Figure 3B:
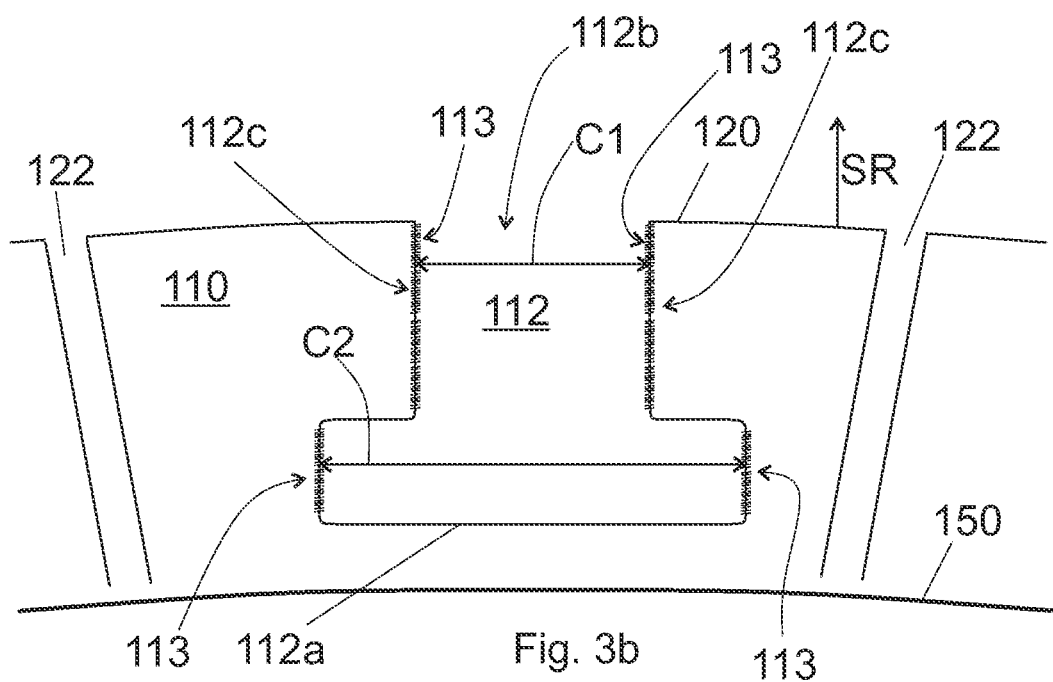
FIG. 3b illustrates, in a tread block of a tire, a blind hole comprising markings on its wall(s), as viewed cross-sectionally from a side.

Now referring to FIG. 3b, the wall(s) 112c of the blind hole 112 may comprise a marking 113 or several markings 113 being indicative of the blind hole 112 having been machined to the tread block 110 after the tread block 110 was fabricated. Such a marking 113 or markings 113 may be provided upon machining the blind hole 112, i.e. machining the blind hole 112 in such a way that the wall(s) 112c comprise(s) marking(s) 113. In effect, the marking(s) 113 entail that it is possible to discern the blind hole 112 as having been manufactured by machining instead of, for example, with metal rods during fabrication of the tire 100. Such marking(s) 113 may be constituted by, for example, the inherent or controlled resultant roughness brought about the implement with which the blind hole 112 is manufactured.

Thus, the disclosed solution also comprises a prefabricated tire 100 comprising tread blocks 110 forming a tread 120 of the tire 100, wherein at least one of the tread blocks 110 defines such a blind hole 112 that the blind hole 112 has a first cross section C1 at a first depth de1 and a second cross section C2 at a second depth de2, wherein the second cross section C2 is greater than the first cross section C1 and the second depth de2 is greater than the first depth de1. Furthermore, and in particular, in such a tire 100, a wall 112c of the blind hole 112 comprises a marking 113 being indicative of the blind hole 112 having been machined to the tread block 110 after the tread block 110 was fabricated.

Correspondingly, the disclosed solution also comprises a prefabricated tire 100 comprising tread blocks 110 forming a tread 120 of the tire 100, and a removable insert 200 arranged in one of the tread blocks 110 such that removal of the insert 200 from the tread block 110 exposes such a blind hole 112 that the blind hole 112 has a first cross section C1 at a first depth de1 and a second cross section C2 at a second depth de2, wherein the second cross section C2 is greater than the first cross section C1 and the second depth de2 is greater than the first depth de1. Furthermore, and in particular, in such a tire 100, a wall 112c of the blind hole 112 comprises a marking 113 being indicative of the blind hole 112 having been machined to the tread block 110 after the tread block 110 was fabricated.

Figure 5A:
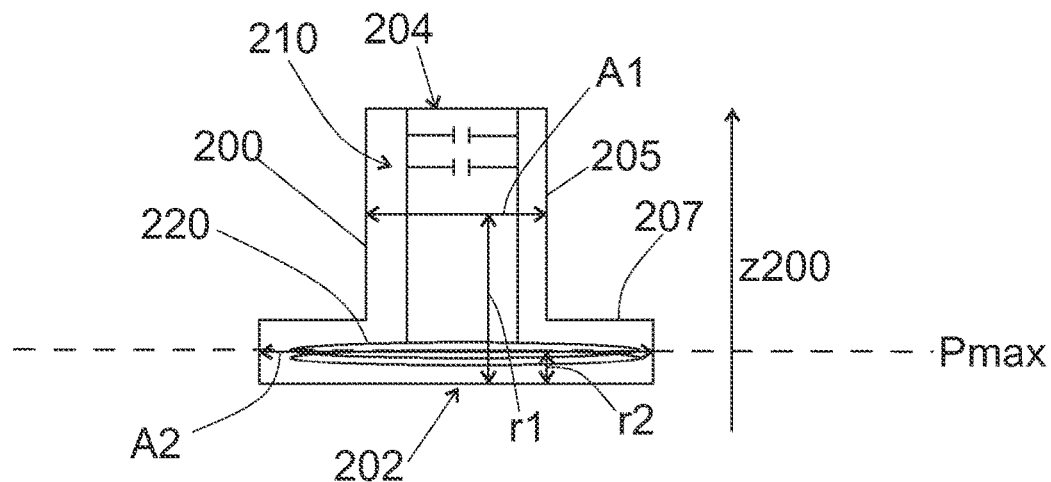
FIG. 5a illustrates a insert according to an example, as viewed cross-sectionally from a side.
Figure 5B:
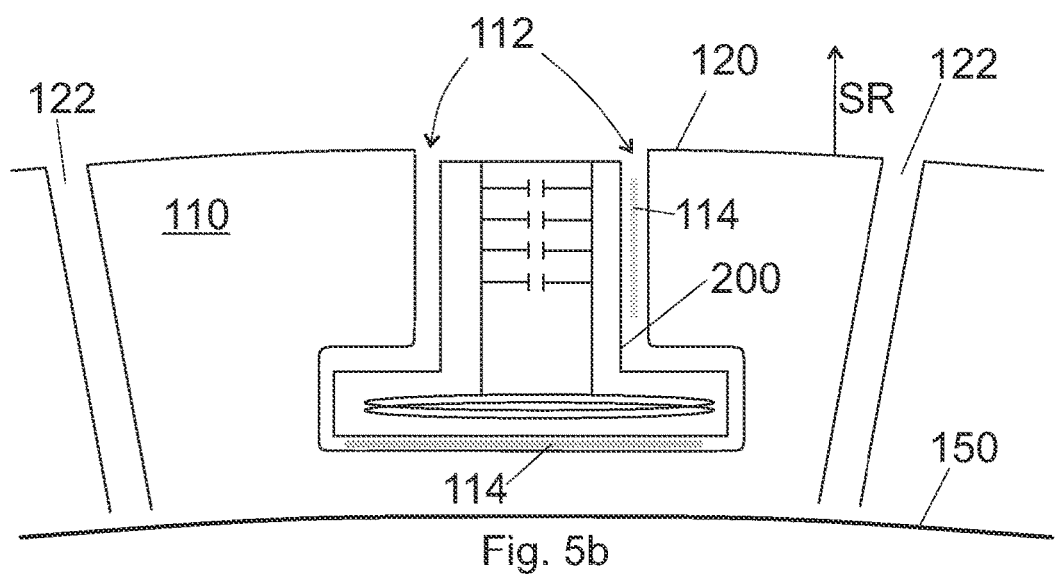
FIG. 5b illustrates an insert in a blind hole according to examples, as viewed cross-sectionally from a side.

Such marking(s) 113 may additionally increase the friction between the blind hole 112 and the insert 200 installed in the blind hole 112 and/or enable greater adhesive force between the blind hole 112 and the insert 200 if adhesive 114 is so used, as in an example illustrated in FIG. 5b. Thus, adhesive 114 may be applied in between the insert 200 and the tread block 110 in order to improve the staying of the insert 200 in its installed position in the blind hole 112.

Figure 4A:
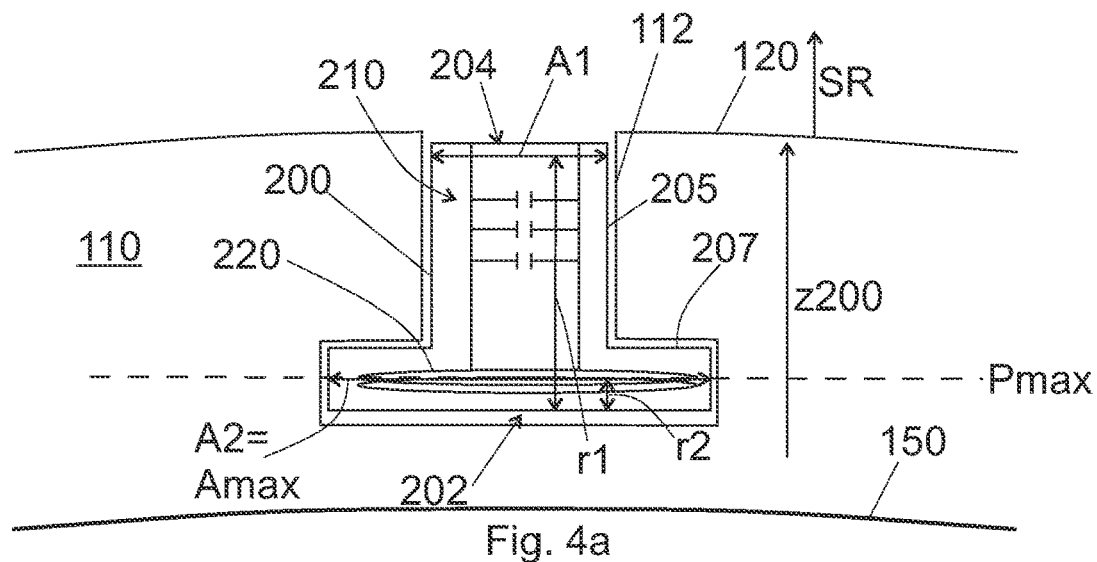
FIGS. 4a-4c illustrate an insert in a blind hole according to examples, as viewed cross-sectionally from a side.

Now referring to FIG. 4a, according to the disclosed solution, the insert 200 extends in a longitudinal direction z200 from a bottom 202 of the insert to a top 204 of the insert. Furthermore, the insert 200 comprises a side wall 205 or side walls 205 between its top 204 and its bottom 202. Further still, the insert 200 has a first cross section A1 at a first longitudinal position r1 from the bottom 202 and a second cross section A2 at a second longitudinal position r2 from the bottom 202, wherein the first longitudinal position r1 is located closer to the top 204 than the second longitudinal position r2 and the second cross section A2 is greater than the first cross section A1.

According to an example, and preferably if a blind hole 112 is a hollow of revolution, the insert 200 is a solid of revolution.

Nonetheless, preferably the insert 200 and the blind hole 112 receiving the insert 200 are substantially of the same geometrical shape. That is, preferably, the blind hole 112 is machined to a tread block 110 such that the shape of the blind hole 112 is geometrically congruent with the insert 200. By doing so, the staying of the insert 200 in its installed position in the blind hole 112 may be improved as there is uniform and little to no clearance between the insert 200 and the blind hole 112. It is to be appreciated that in the case the insert 200 and the blind hole 112 being substantially of the same geometrical shape, the blind hole 112 may, in some cases, be smaller than the insert 200 in terms of the volume of the blind hole 112, as the material composition of its wall(s) 112c and its bottom 202 allow the blind hole 112 to stretch and thereby increase in volume.

Consistently with the foregoing, according to the disclosed solution, the insert 200 may be inserted to the blind hole 112 such that the bottom 202 of the insert 200 is inserted deeper in the blind hole 112 than the top 204 of the insert 200.

Figure 4B:
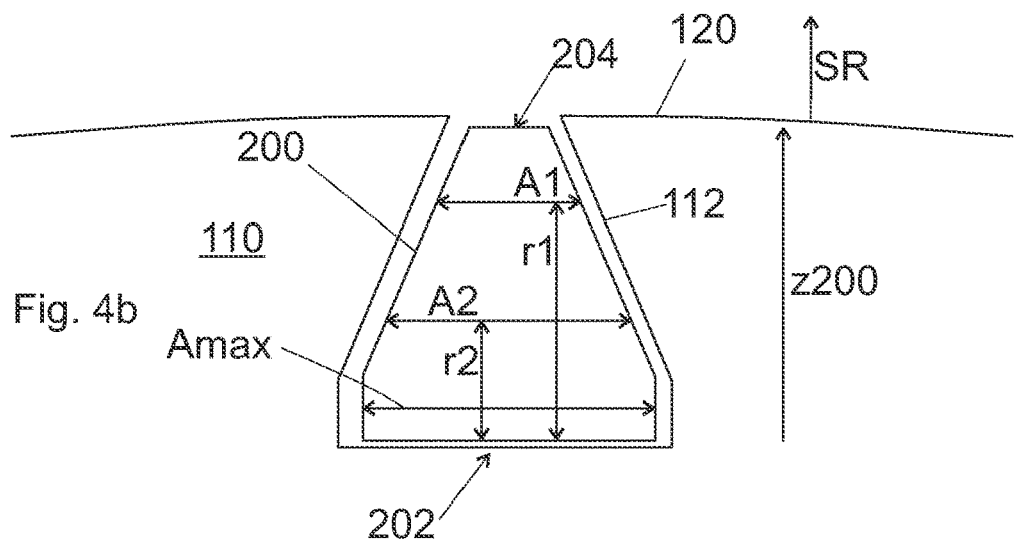
Figure 4C:
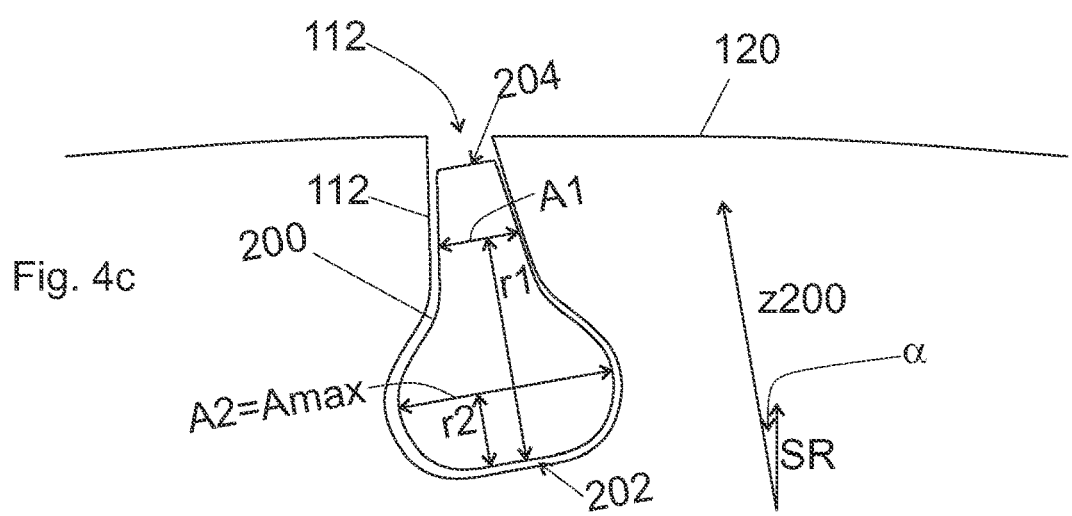

Thus, the insert 200 may comprise a flange 207 which is wider than the rest of the insert 200 such that the flange 207 resides at the non-surface 900-facing end of the insert 200. The flange 207 may be located such that it resides on the plane on which the cross section of the insert 200 is at its greatest—i.e. on the plane of maximum cross section Pmax there is the maximal cross-sectional area Amax for the insert 200. However, the maximal cross-sectional area Amax need not correspond to a specific flange 207 as illustrated according to examples in FIGS. 4b-4c.

Figure 6A:
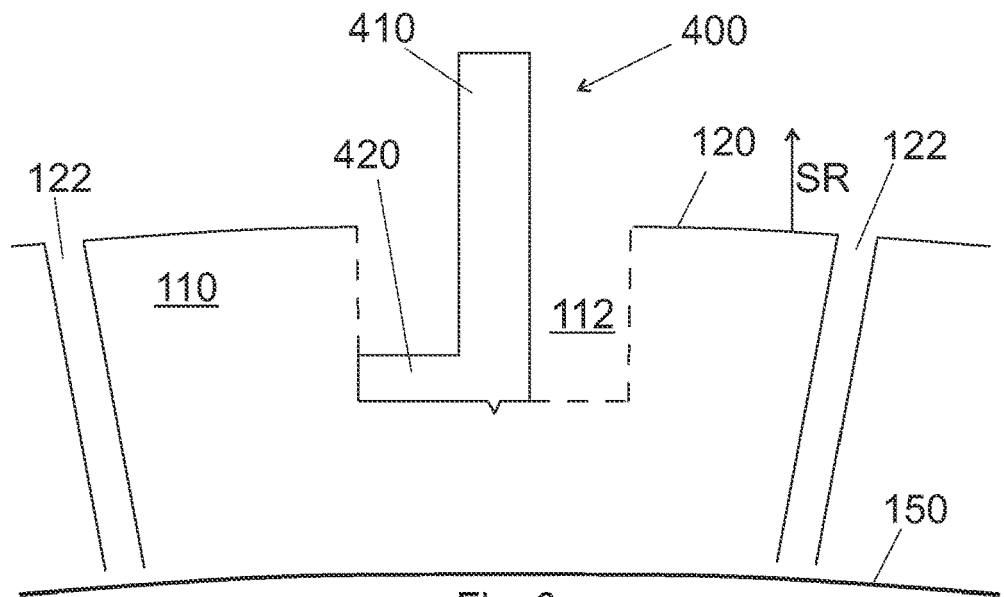
FIGS. 6a-6c illustrate sequentially progressing phases of machining, with a drill bit comprising a protrusion, a blind hole into a tread block of a tire, as viewed cross-sectionally from a side.
Figure 6B:
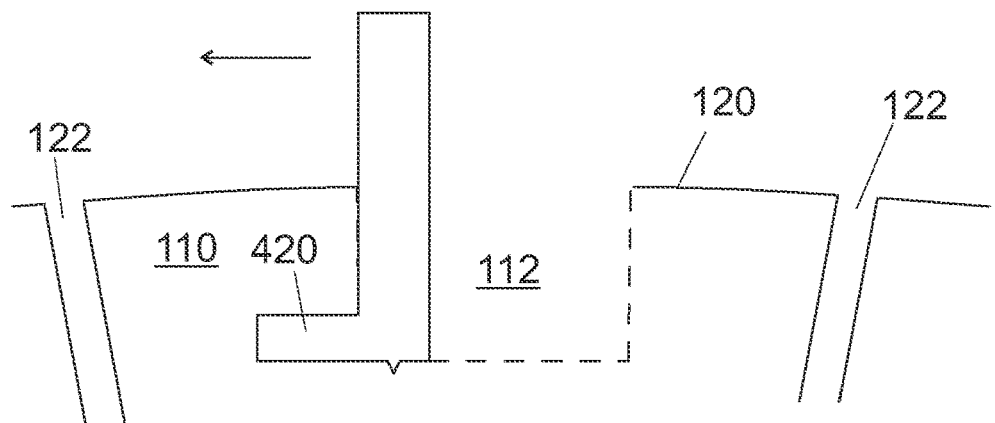
Figure 6C:
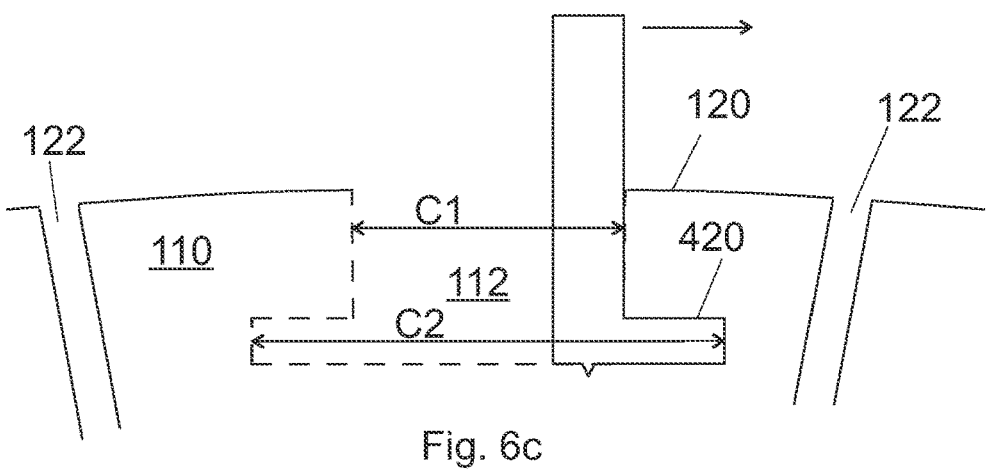

Now referring to FIGS. 6a to 6c, a blind hole 112 may be machined to a tread block 110 of a tire 100 by drilling by using a drill bit 400 that comprises a shaft 410 extending in a longitudinal direction of the drill bit 400. Furthermore, such a drill bit 400 may comprise a protrusion 420 such as a flange 430—as specifically illustrated in FIG. 9—radially extending from the shaft 410. In such a case, the second cross section C2 of the blind hole 112 may be formed by using the protrusion 420 of the drill bit 400. Thus, as sequentially illustrated in FIGS. 6a to 6c, a drill bit 400 comprising the protrusion 420 may penetrate along the longitudinal direction z200 into the tread block 110 thereby forming the first cross section C1, and thereafter move perpendicularly to the longitudinal direction z200 thereby forming the second cross section C2 with the protrusion 420.

Alternatively or in addition, and now referring to FIGS. 7a to 7c, a blind hole 112 may be machined to a tread block 110 of a tire 100 by drilling by using a drill bit 400 that comprises a shaft 410 extending in a longitudinal direction of the drill bit 400. Furthermore, a part 450 of the shaft 410 of the drill bit 400 may be configured to radially expand in use. In such a case, the second cross section C2 of the blind hole 112 may be formed by using the radially expanding part 450 of the shaft 410. In other words, the cross section C2 of the blind hole 112 may be formed with a diameter-expanding part of a drill bit 400. Thus, as sequentially illustrated in FIGS. 7a to 7c, a drill bit 400 comprising the a radially expanding part 450 may penetrate, with the radially expanding part 450 in a non-expanded state, along the longitudinal direction z200 into the tread block 110 thereby forming the first cross section C1. Thereafter, the radially expanding part 450 may be expanded, whereby the expanded part 450 in an expanded state may form the second cross section C2. And lastly, the drill bit 400 may be withdrawn, with the radially expanding part 450 in a non-expanded state, from the formed blind hole 112.

Figure 8A:
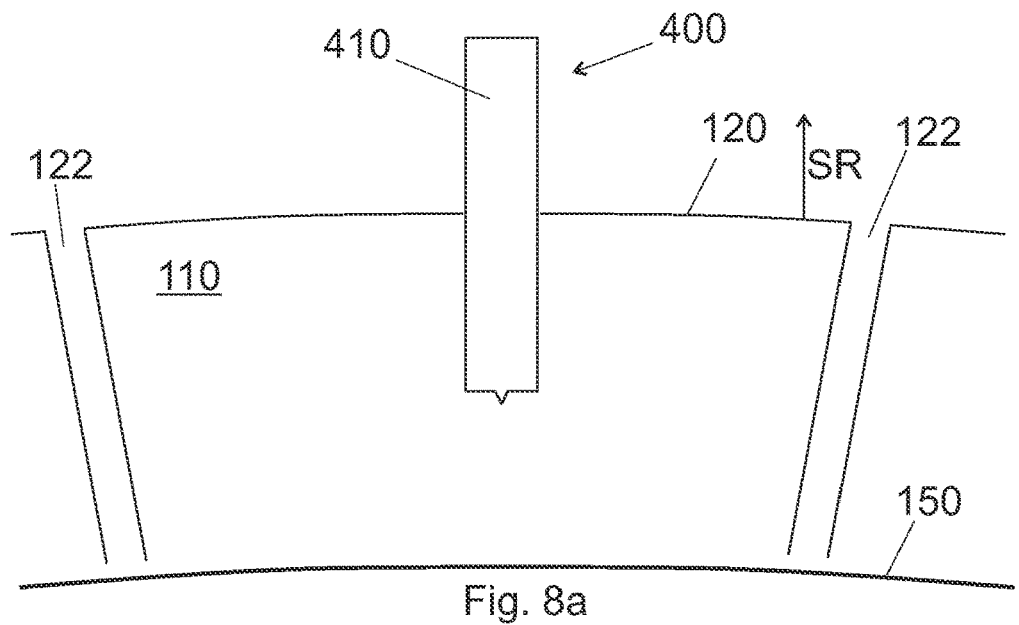
FIGS. 8a-8c illustrate sequentially progressing phases of machining, with a drill bit used in various angles, a blind hole into a tread block of a tire, as viewed cross-sectionally from a side.
Figure 8B:
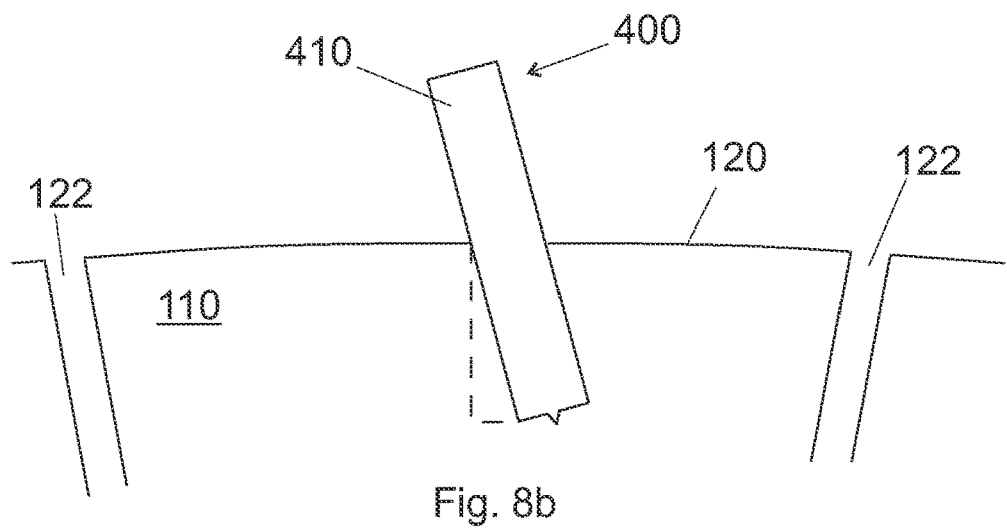
Figure 8C:
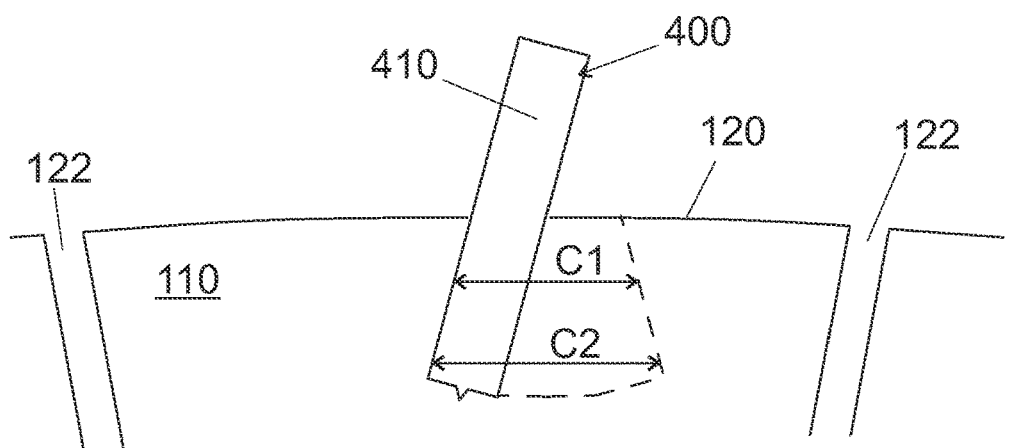

Alternatively, or in addition, and now referring to FIGS. 8a to 8c, a blind hole 112 may be machined to a tread block 110 of a tire 100 by drilling by using a drill bit 400 comprising a shaft 410 in such a way that the second cross section C2 of the blind hole 112 is made larger than the first cross section C1 by arranging the longitudinal direction of the shaft 410 at various angles relative to a normal N1 of the tread 120. Thus, as sequentially illustrated in FIGS. 8a to 8c, the drill bit 400 may first penetrate along the longitudinal direction z200 into the tread block 100, after which the drill bit 400 may be tilted into various angles in such a manner that the bottom 112a of the blind hole 112 becomes cross-sectionally larger than its aperture 112b. The resulting blind hole 112 may be a hollow of revolution in shape.

Figure 16A:
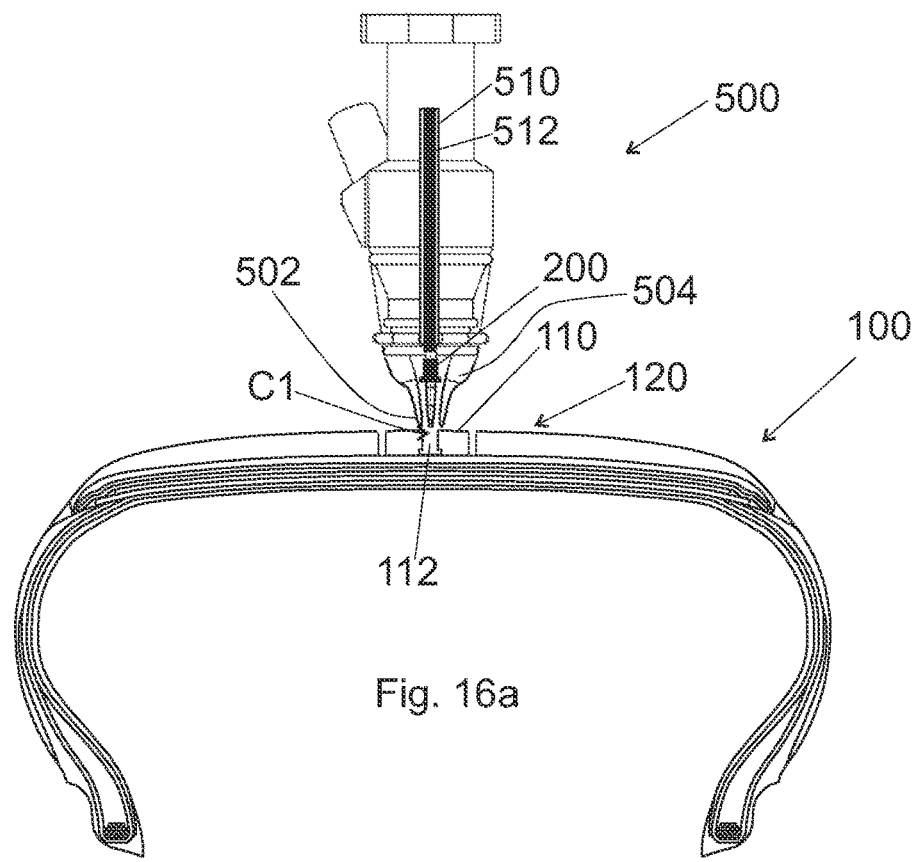
FIGS. 16a-16b illustrate sequentially progressing phases of inserting an insert into a blind hole with a tool, as viewed cross-sectionally from a side.
Figure 16B:
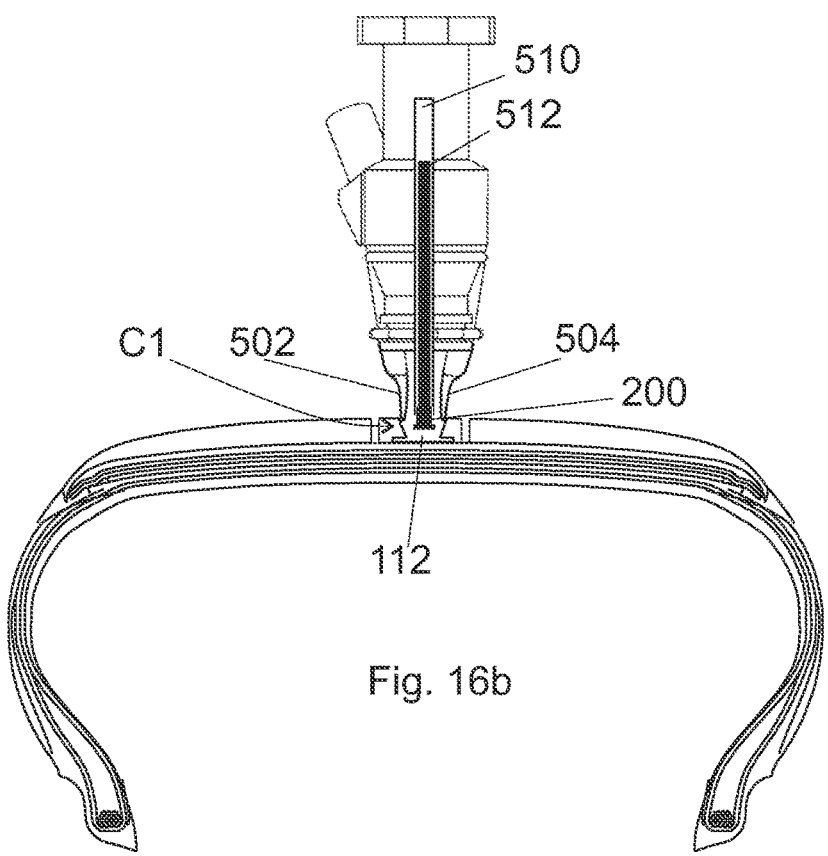
Figure 16C:
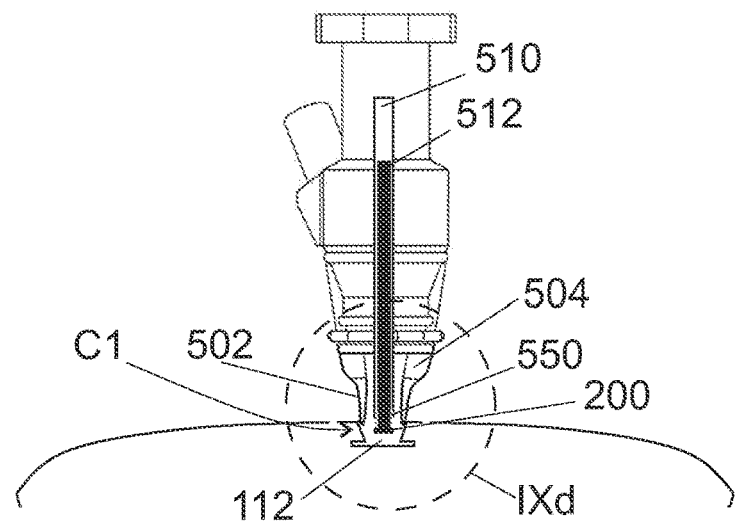
FIG. 16c illustrates, insertion of an insert in a blind hole with a tool, as viewed cross-sectionally from a side.

Now referring to FIGS. 16a and 16b, an insert 200 may be inserted into a blind hole 112 such that at least part of the blind hole 112 that has the first cross section C1 is laterally stretched while inserting the insert 200 into the blind hole 112. That is, the blind hole 112 may be stretched wider before inserting the insert 200 into the blind hole 112, thus making the insertion of the insert 200 into the blind hole 112 easier. To facilitate such stretching, the material of the tread block 110 comprising the blind hole 112 may have a Shore hardness of from 50 ShA to 80 ShA at a temperature of 23° C.

According to an example, and as illustrated in FIG. 16b, such later stretching may be brought about by using at least three jaws 502, 504. Such jaws 502, 504 may be a part of a tool 500, which tool 500 may also comprise additional functionality, as described below.

After an insert 200 has been inserted into the blind hole 112, the jaws 502, 504 may be removed from the blind hole 112, thereby allowing the tread block 110 to envelop the insert 200 in accordance with what has been described above.

Figure 14:
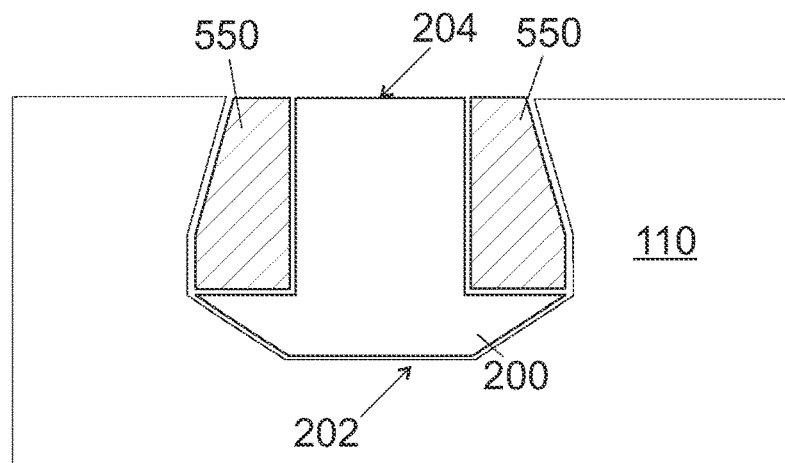
FIG. 14 illustrates, in a blind hole, an insert in a sleeve, as viewed cross-sectionally from a side.
Figure 15A:
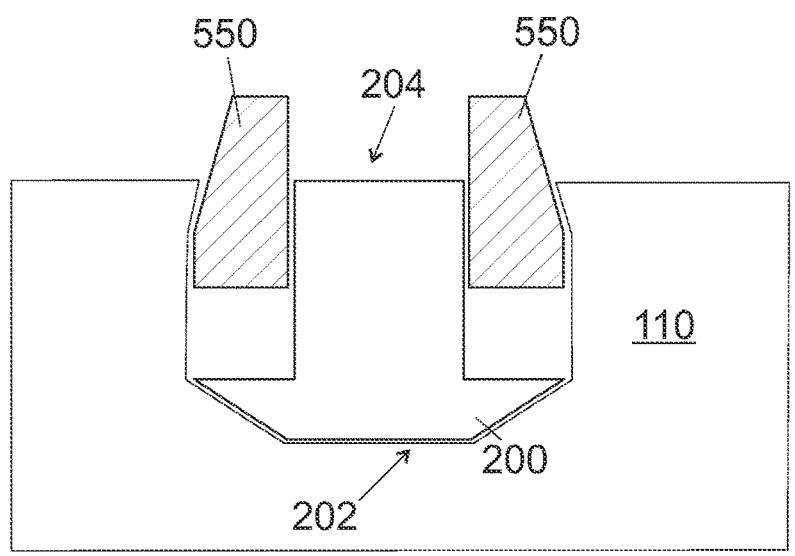
FIGS. 15a-15b illustrate sequentially progressing phases of removing a sleeve from a blind hole such that a sleeve-installed insert remains in the blind hole, as viewed cross-sectionally from a side.
Figure 15B:
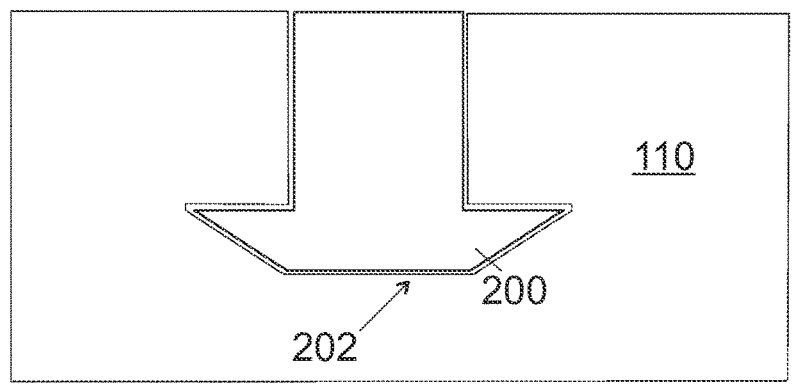

Regardless of whether any jaws 502, 504 are employed in conjunction with inserting an insert 200 into a blind hole, the insertion may be facilitated by applying a friction-reducing substance to the insert 200 and/or to the blind hole 112. Such friction-reducing substance may also facilitate the removal of a sleeve 550 from a blind hole as described below and as illustrated in FIGS. 14 and 15a to 15b.

Now referring to FIGS. 10a and 10b, before inserting an insert 200 into a blind hole 112, in accordance with what has been described above, an insert 200 or at least a part of the insert 200 may be arranged into a sleeve 550. According to an example, the insert 200 or at least a part of the insert 200 may be arranged into the sleeve 550 by using suction. For this purpose, the sleeve 550 may comprise a conduit and/or an aperture through which suction pressure may conveyed from a source of suction pressure (not depicted) into the cavity 565 of the sleeve, which cavity 565 is to house the insert 200 or at least a part of the insert 200.

By arranging the insert 200 or at least a part of the insert 200 into a sleeve 550, the insert 200 may be protected during its insertion into the blind hole 112. For example, the use of a sleeve 550 may ensure the dimensional and shape integrity of the insert 200 during its insertion into the blind hole 112. Thus, the insert 200 may be inserted into the blind hole with the sleeve 550. After such insertion, and as sequentially illustrated in FIGS. 14 and 15a to 15b, the sleeve 550 may be removed from the blind hole 112, with the insert 200 remaining in its installed position in the blind hole 112.

As illustrated in FIGS. 10a and 10b, the sleeve 550 comprises a wall 555, which wall may be configured to laterally surround at least a part of the insert 200. Advantageously, the wall 555 is made of metal, ceramic, polymer or composite. Preferably, the thickness $t_{555}$ of the wall 500 is at least 0.3 mm.

For example, and as illustrated in FIGS. 10a and 10b, in case the insert 200 comprises a flange 207, the wall 555 of the sleeve 550 may surround that part of the insert 200 which does not constitute the flange 207. That is, the insert 200 minus the flange 207 may reside inside the sleeve 550 during the installation of the insert 200 into the blind hole 112. In such a case, advantageously the thickness $t_{555}$ of the wall 555 of the sleeve 550 corresponds to the outward protrusion of the flange 207 so that the flange 207 may gain support from the sleeve 550 during the installation of the insert 200 into the blind hole 112. Furthermore, advantageously the cross-sectional shape of the sleeve 550 corresponds to the cross-sectional shape of the insert 200, also including the possible flange 207, as illustrated according to examples in FIGS. 10c1-2, 10d1-2 and 10e1-2.

Now referring to FIGS. 11a to 11b, such a sleeve 550 may comprise a cavity 565 configured to receive an insert 200 or a part of an insert 200. In addition, the sleeve 550 may comprise at least a first aperture 560 and possibly also a second aperture 570. The first aperture 560 has a first cross section A3.

Now referring to FIGS. 12a to 12b, the first cross section A3 of the sleeve 550 may be configured to be less than the second cross section A2 of the insert 200, in which case a part of the insert 200, such as its flange 207, remains outside the cavity 565 of the sleeve 550, as illustrated in FIG. 12b. In such a case, preferably the geometrical shape of the cavity 565 is substantially congruent with the geometrical shape of the part of the insert 200 to be housed within the cavity 565.

Alternatively, and now referring to FIGS. 13a to 13b, the first cross section A3 of the sleeve 550 may be configured to be at least equal to the second cross section A2 of the insert 200, in which case the whole insert 200 or substantially the whole insert 200 may be housed within the cavity 565 of the sleeve 550, as illustrated in FIG. 13b. In such a case, preferably the geometrical shape of the cavity 565 is substantially congruent with the geometrical shape the insert 200 to be housed within the cavity 565.

As a possibility, the sleeve 550 may be arranged to be an integral part of a punch 512, as illustrated in FIGS. 12a to 12c and 13a to 13c. Such a punch 512 may be used to insert the insert 200 into the blind hole 112. As illustrated in FIGS. 16a to 16e, such a punch 512 may be a part of a tool 500 configured to be employed to insert the insert 200 into the blind hole 112, which tool 500 may also comprise the above-described jaws 502, 504.

Figure 16D:
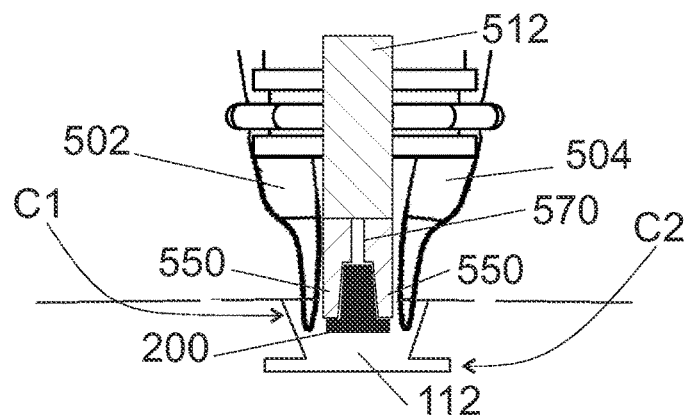
FIG. 16d illustrates, in a close-up, one end of the tool of FIG. 16c with an insert, as viewed cross-sectionally from a side.
Figure 16E:
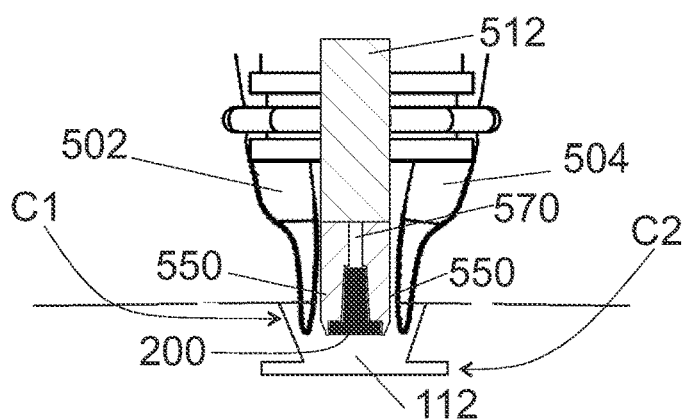
FIG. 16e illustrates, the tool of FIG. 16d, according to an alternative example, with an insert, as viewed cross-sectionally from a side.

If the sleeve 550 is arranged to be an integral part of a punch 512, the sleeve 550 may comprise a cavity 565 configured to receive substantially a whole insert 200, as illustrated in FIG. 16e consistently with FIGS. 13a and 13b, or a part of an insert 200, as illustrated in FIG. 16d consistently with FIGS. 12a and 12b.

In case the sleeve 550 is an integral part of such a punch 512 that is used to insert the insert 200 into the blind hole 112, the sleeve 550 may be removed from the blind hole 112 after inserting the insert 200 to the blind hole 112 with the sleeve—in accordance with what is illustrated in FIGS. 14 and 15a to 15b. In doing so, according to examples and in accordance with what is illustrated in FIGS. 12c and 13c, the insert 200 may be expelled from the sleeve 550, or such expelling may be facilitated, by using a rod 514, which rod 514 may push the insert 200 out of the sleeve 550. Alternatively or in addition, pressurized gas can be used for the same expelling purpose. Thus, for the purposes of such use of a rod 514 and/or pressurized gas, the sleeve 550 may be furnished with a second aperture 570, as denoted in FIGS. 11a and 11b.

As illustrated in FIGS. 16a to 16d, a tool 500 configured to be used in inserting an insert 200 into a tire 100 may comprise the jaws 502, 504 and/or the punch 512—also possibly including the sleeve 550—and/or the expelling rod 514 and/or the pressurized gas-based expelling functionality.

Figure 17:
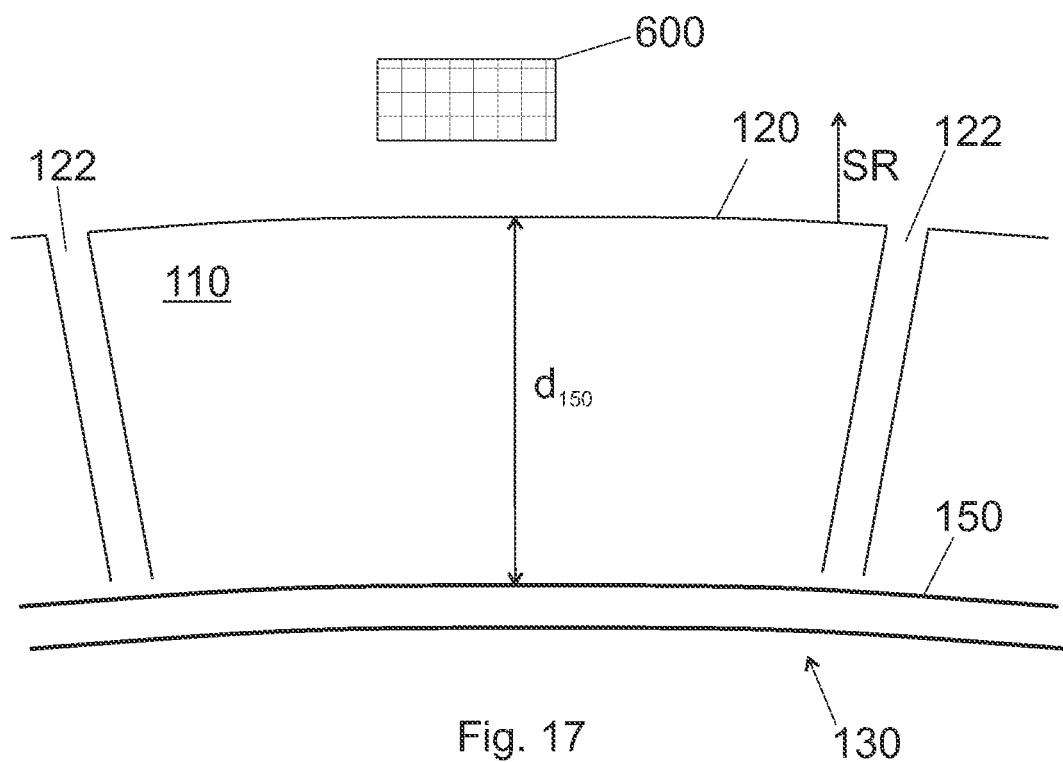
FIG. 17 illustrates determining a distance between a tread and a reinforcing belt, as viewed cross-sectionally from a side.

As noted above, and now referring to FIG. 17, a tire 100, for example a prefabricated tire 100, may comprise a reinforcing belt 150 between the tread 120 and the inner surface 130 of the tire 100. In such a case it is preferable that the blind hole 112 machined to a tread block 110 of the tire does not penetrate and thereby damage the reinforcing belt 150. Consequently, preferably the method of machining the blind hole 112 comprises determining a distance $d_{150}$ between the tread 120 and the reinforcing belt 150 and machining such a blind hole 112 to a tread block 110 that a depth $d_{112}$ of the blind hole 112 is less than the distance $d_{150}$ between the tread 120 and the reinforcing belt 150. That is, preferably the blind hole 112 is machined in such a way that it will not extend from the tread 120 to the reinforcing belt 150, but extends to a lesser depth into the tread block 110.

As an additional possibility, if the tire 100 comprises further elements on top of the reinforcing belt 150, which elements preferably are not to be damaged with machining a blind hole 112 into them, the thickness of such elements may be taken into account in machining the blind hole 112 in accordance with what is described immediately above. That is, in such a case, preferably the method of machining the blind hole 112 comprises determining a distance $d_{150}$ between the tread 120 and the reinforcing belt 150 and machining such a blind hole 112 to a tread block 110 that a depth $d_{112}$ of the blind hole 112 is less than the distance $d_{150}$ between the tread 120 and the reinforcing belt 150 plus the thickness of other elements not to be penetrated into with the blind hole 112.

Determining a distance $d_{150}$ between the tread 120 and the reinforcing belt 150 may, for example, be premised on the reinforcing belt 150 comprising ferromagnetic or paramagnetic material such as ferromagnetic or paramagnetic metal, such as steel. In such a case, the determining of the distance $d_{150}$ between the tread 120 and the reinforcing belt 150 may be accomplished by using an inductive position sensor 600. Such an inductive position sensor 600 may be configured to sense the distance to a ferromagnetic or paramagnetic target.

The invention claimed is:

1. A method for inserting an insert into a tread of a prefabricated tire, the method comprising:
   providing a prefabricated tire, the prefabricated tire comprising a tread comprising a tread block;
   drilling a blind hole to the tread block, the blind hole having a first cross section at a first depth and a second cross section at a second depth, wherein the second cross section is greater than the first cross section, and the second depth is greater than the first depth, wherein the drilling of the blind hole is performed with a drill bit, the drill bit comprising a shaft having a longitudinal direction along the drill bit, a flange extending radially outward from the shaft, the flange connecting transversely to the shaft;
   the material of the tread block having a Shore hardness of from 50 ShA to 80 ShA, according to ASTM standard D2240, version 15e1, at a temperature of 23° C.;
   forming the second cross section of the blind hole with the flange of the drill bit;
   inserting the insert into the blind hole in the prefabricated tire;
   wherein the insert has a longitudinal direction from a bottom of the insert to a top of the insert and has a first cross section at a first longitudinal position from the bottom and a second cross section at a second longitudinal position from the bottom, wherein the first longitudinal position is located closer to the top of the insert than the second longitudinal position;
   wherein the second cross section is greater than the first cross section; wherein the step of inserting comprises inserting the insert into the blind hole so the bottom of the insert is inserted deeper in the blind hole than the top of the insert;
   wherein the insert comprises a primary capacitive component and a primary inductive component, and the step of drilling comprises drilling the blind hole to the tread block so that a shape of the blind hole is congruent with the insert; and
   wherein the second cross section comprises a maximum cross-sectional area of the insert, and a plane of maximum cross section comprises the second cross section and intersects the primary inductive component.

2. The method of claim 1, wherein the insert is configured to measure a condition of the tire.

3. The method of claim 1, wherein the insert is configured to measure an environmental parameter.

4. The method of claim 1, wherein the insert is configured to indicate a condition of the tire.

5. The method of claim 1, comprising laterally stretching at least a part of the blind hole that has the first cross section while inserting the insert to the blind hole.

6. The method of claim 5, comprising laterally stretching at least a part of the blind hole that has the first cross section by using at least three jaws.

7. The method of claim 1, comprising before inserting the insert into the blind hole, arranging at least a part of the insert into a sleeve, inserting the insert to the blind hole with the sleeve.

8. The method of the claim 7, wherein at least a part of the insert is arranged into the sleeve by using suction.

9. The method of claim 7, wherein a punch having the sleeve integrally formed is used to insert the insert into the blind hole, whereby the method comprises removing the sleeve from the blind hole after inserting the insert to the blind hole with the sleeve.

10. The method of claim 9, wherein the insert is expelled from the sleeve using pressurized gas and/or a rod.

11. The method of claim 7, wherein a wall of the sleeve is configured to laterally surround at least a part of the insert, the wall is made of metal, ceramic, polymer or composite, and a thickness of the wall of the sleeve is at least 0.3 mm.

12. The method of claim 1, wherein the prefabricated tire comprises a reinforcing belt between the tread and an inner surface of the prefabricated tire, the method comprising determining a distance between the tread and the reinforcing belt and drilling the blind hole to the tread block so that a depth of the blind hole is less than the distance between the tread and the reinforcing belt.

13. The method of claim 12, wherein the reinforcing belt comprises ferromagnetic or paramagnetic material, the method comprising determining the distance between the tread and the reinforcing belt using an inductive position sensor.

14. The method of claim 1, wherein the blind hole is drilled so a wall of the blind hole comprises a marking indicating the blind hole having been drilled to the tread block after the tread block was fabricated.

* * * * *